No. 856,464. PATENTED JUNE 11, 1907.
R. H. HAVEN & F. ROCKWELL.
LAWN RAKE.
APPLICATION FILED MAR. 4, 1907.
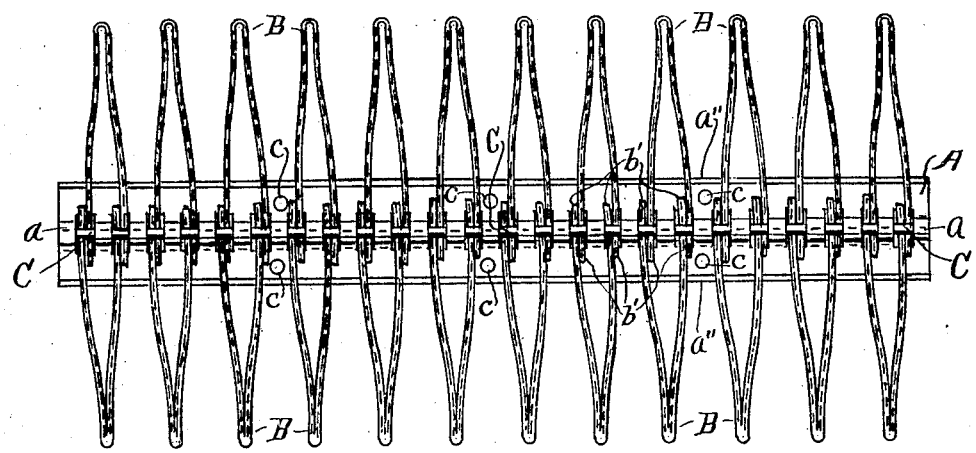
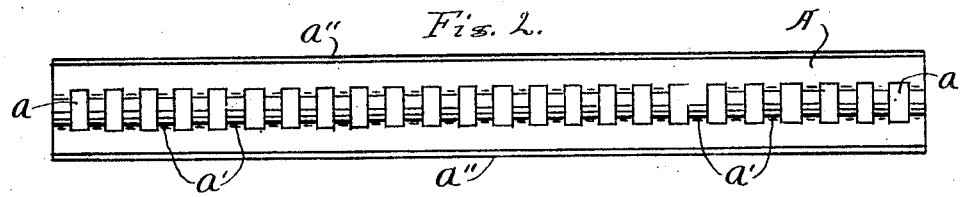
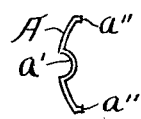
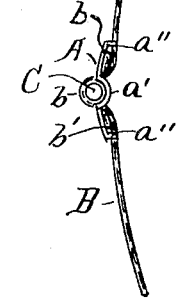
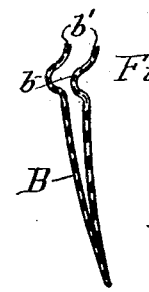
Inventors
Robert H. Haven
Frank Rockwell
Witnesses
A. Allgier
O. C. ...
By
Ithiel J. Cilley
Attorney

UNITED STATES PATENT OFFICE.

ROBERT HILTON HAVEN AND FRANK ROCKWELL, OF GRAND RAPIDS, MICHIGAN.

LAWN-RAKE.

No. 856,464.  Specification of Letters Patent.  Patented June 11, 1907

Application filed March 4, 1907. Serial No. 360,611.

*To all whom it may concern:*

Be it known that we, ROBERT HILTON HAVEN and FRANK ROCKWELL, citizens of the United States, residing at Grand Rapids, in the county of Kent and State of Michigan, have invented certain new and useful Improvements in Lawn-Rakes, of which the following is a specification.

Our invention relates to improvements in lawn rakes and its object is to provide a rake that may be readily assembled or taken apart and will be perfectly rigid and strong when assembled for use.

We attain this object by the mechanism illustrated in the accompanying drawing in which Figure 1 is an elevation of a lawn rake assembled, but with the handle or stale removed. Fig. 2 is an elevation of the plate to which the teeth are secured. Fig. 3 is an end elevation of the same. Fig. 4 is the same with the teeth in place, and Fig. 5 is a perspective view of a tooth detached from the plate.

Similar letters refer to similar parts throughout the several views.

In the construction of our rake head we use a sheet metal support of practically the form shown at A in the several figures. This plate is perforated with a number of mortises or slots $a$, and the partitions between these slots are formed concavo convex, as at $a'$, more fully illustrated in Figs. 3 and 4, for the reception of the supporting or tie wire C, and the edges are, preferably, turned down, practically, at right angles with the plate, as indicated at $a''$ $a'''$, to form supports for the teeth.

The teeth are made of wire and practically of the form shown in Figs. 1 and 4 or 5 and are designated by the letter B in the several figures. The ends of the teeth that are connected with the plate A have offsets $b$ that are designed to pass through the slots $a$ in the plate and the ends $b'$ rest on the surface of the plate so that when they are in place on the plate and the wire C is passed through the openings formed by the curves $a'$ of the partitions and the curves $b$ of the teeth B, the teeth will be, thereby, held firmly and rigidly to place in the plate A so that they cannot be removed or become loose until the wire rod C is removed.

The apertures or holes $c$ $c$ are for the purpose of securing the handle to the head by means of screws, rivets or bolts, or any other available way, but as this feature is not essential to or in any way connected with our invention we do not deem it necessary to further illustrate this feature.

We prefer that the teeth in this rake be bifurcated, especially when designed for a lawn rake, as indicated in Figs. 1 and 5, but for other purposes it may be constructed with single teeth, as indicated in Fig. 4, as the manner of securing the teeth by the use of the curves in the plate and at the adjacent ends of the teeth with the interlaced wire rod C will render the teeth perfectly rigid and firm in the plate.

Having thus fully described our invention, what we claim as new and desire to secure by Letters Patent of the United States is:

1. The combination in a lawn rake, of a sheet metal plate having slots for the passage of portions of teeth, an outwardly curved set of partitions between the slots, bifurcated teeth having curved bearings passed through the slots in the plate and short ends projecting beyond the slots and resting on the plate, and a wire rod passed through the opening formed by the curves in the plate and the ends of the teeth, substantially as and for the purpose set forth.

2. In combination, a plate having slots through it and outwardly curved partitions between the slots, the edges of the plate turned practically at right angles with the plate, bifurcated teeth having curved portions passed through the slots forming a round hole with the curved partitions of the plate, and short ends extending back therefrom and bearing on the surface of the plate, and a wire rod passed through said round holes, substantially as and for the purpose set forth.

3. In combination, a plate having slots through it and outwardly curved partitions between them and the outer edges of the plate turned at right angles with the plate, teeth having curves at one end to engage with the plate and form round holes with the curved partitions of the plate, and having short ends projecting over onto the plate, 5 and a wire rod passed through the holes formed by the curves in the teeth and in the plate, substantially as and for the purpose set forth.

Signed at Grand Rapids, Michigan, March 2" 1907.

ROBERT HILTON HAVEN.
FRANK ROCKWELL.

In presence of—
  I. J. CILLEY,
  A. ALLGIER.